(12) United States Patent
Kinnersly

(10) Patent No.: US 6,296,417 B1
(45) Date of Patent: Oct. 2, 2001

(54) CIRCLIPS

(75) Inventor: Richard F. Kinnersly, Romsey (GB)

(73) Assignee: Sustainable Engine Systems Limited, London (GB)

( * ) Notice: Subject to any disclaimer, the term of this patent is extended or adjusted under 35 U.S.C. 154(b) by 0 days.

(21) Appl. No.: 09/158,096

(22) Filed: Sep. 22, 1998

Related U.S. Application Data

(63) Continuation of application No. PCT/GB97/00813, filed on Mar. 21, 1997.

(30) Foreign Application Priority Data

Mar. 22, 1996 (GB) .................................................. 9606013

(51) Int. Cl.⁷ .................................................. F16D 1/00
(52) U.S. Cl. .................... 403/366; 403/332; 403/DIG. 7
(58) Field of Search .................... 403/326, 327, 403/328, 329, 154, 155, 366, 332, DIG. 7, 365, 371; 285/305, 321, 340, 902; 411/353, 508, 513, 61, 509, 517, 521

(56) References Cited

U.S. PATENT DOCUMENTS

| | | | |
|---|---|---|---|
| 2,831,711 | * 4/1958 | Leadbetter | 403/279 X |
| 3,181,897 | * 5/1965 | Krayenbuhl et al. | 285/305 X |
| 3,319,508 | * 5/1967 | McCormick | 411/517 |
| 3,463,518 | * 8/1969 | Broussard et al. | 285/340 |
| 3,985,379 | * 10/1976 | Normark | 285/902 X |
| 4,815,908 | 3/1989 | Duran et al. | . |
| 5,176,413 | * 1/1993 | Westman | 285/321 |
| 5,411,348 | * 5/1995 | Balsells | 403/326 |
| 5,527,073 | * 6/1996 | Readman | 285/340 |

FOREIGN PATENT DOCUMENTS

| | | | |
|---|---|---|---|
| 0 239 556 | 9/1987 | (EP) . | |
| 2095727 | 2/1972 | (FR) . | |
| 2171716 | 9/1973 | (FR) . | |
| 134769 | * 11/1919 | (GB) | 285/340 |
| 538517 | * 8/1941 | (GB) | 285/340 |
| 770659 | 3/1957 | (GB) . | |
| 999631 | 7/1965 | (GB) . | |
| 1356656 | 6/1974 | (GB) . | |
| 1410123 | 10/1975 | (GB) . | |
| 2 099 534 | 12/1982 | (GB) . | |
| 2 256 248 | 12/1992 | (GB) . | |

\* cited by examiner

*Primary Examiner*—Harry C. Kim
(74) *Attorney, Agent, or Firm*—Nixon & Vanderhye P.C.

(57) ABSTRACT

A circlip (8) comprises a band of material forming an incomplete ring, and has curved bearing surfaces (10, 11) at opposite ends of the major transverse dimension of the band. The major transverse dimension is generally oriented at less than 90°, and preferably a small acute angle α, to the central axis A of the ring in the unstressed state of the circlip (8).

21 Claims, 5 Drawing Sheets

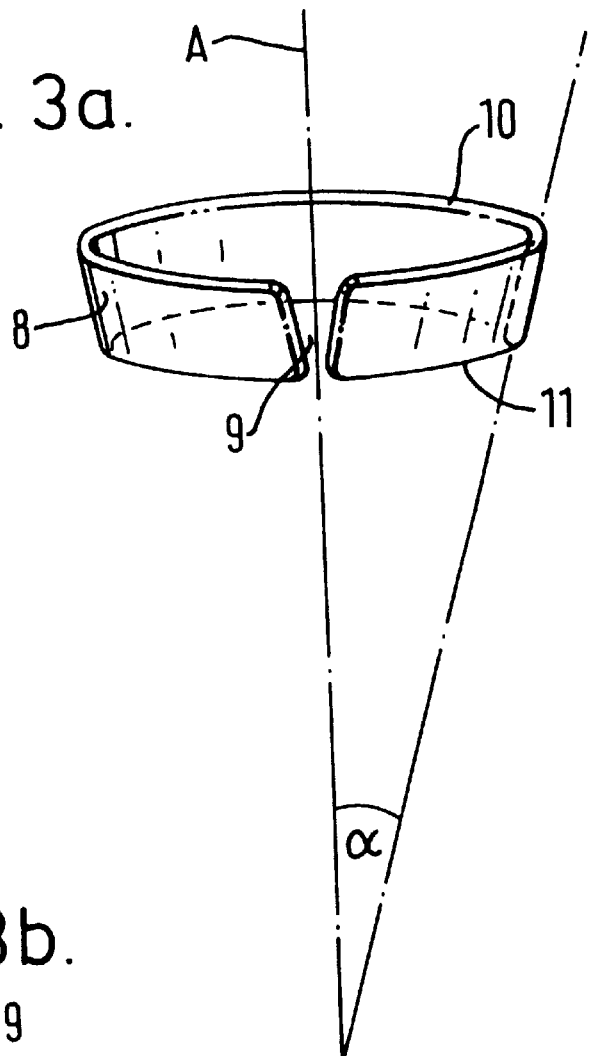
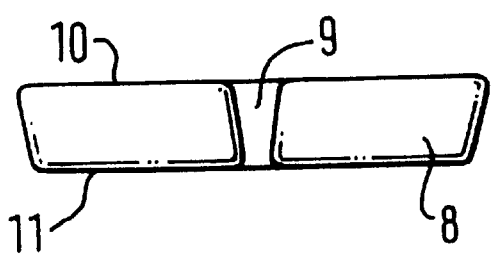
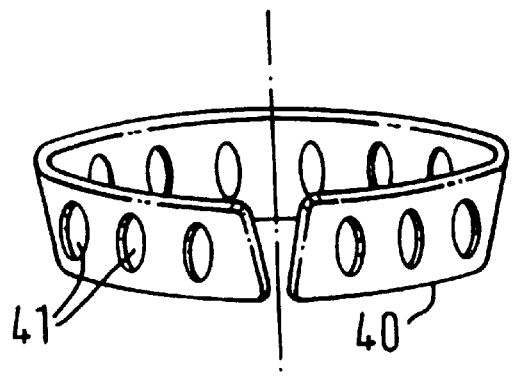

CIRCLIPS

This is a continuation of PCT application No. PCT/GB97/00813, filed Mar. 21, 1997.

BACKGROUND OF THE INVENTION

1. Field of the Invention

This invention relates generally to circlips and apparatus incorporating circlips for connecting two components.

2. Description of the Prior Art

Circlips are used in many engineering applications to inhibit relative axial displacement of two components one of which is at least partially received within the other. FIG. 1 of the accompanying drawings shows a schematic cross-section through part of an assembly incorporating a conventional circlip. Here, the circlip is shown mounted in the mouth of a cylinder 2 for attaching the cylinder to a cylinder base 3 having a radial flange 4 which is received in the cylinder mouth. As illustrated, the circlip is rectangular in transverse cross-section, and its outer diameter edge is received in an annular groove 5, of rectangular cross-section, in the interior surface of the cylinder mouth. For this internal circlip configuration, the circlip is fitted by slipping the circlip over the end of the male, base portion 3, and compressing the circlip radially to allow the circlip to move past the internal lip of the cylinder mouth to register with the annular groove 5, whereupon the circlip springs outwardly into the groove 5. The ends of the circlip adjacent to the discontinuity may be provided with inwardly projecting "ears" having holes to enable installation and removal using circlip pliers for example. Such "eared" circlips (whether internal or external type) cannot be keystoned and are not therefore self-locking. Earless types of circlip may be keystoned, by providing an abutment shoulder (as indicated by the broken line in the figure) on the male portion 3 of the assembly. In both cases, however, since the major transverse dimension of the circlip is disposed radially, significant radial clearance is required for installation and removal.

In the arrangement shown, the central longitudinal axis of the assembly is indicated by the dash-dotted line. In the assembled state, the circlip 1 inhibits relative axial displacement of the components 2,3 against the action of an axial force F in the direction of the arrow in the figure, for example due to pressure of gas in the cylinder. It can be seen that the circlip operates in shear, with the plane of its reaction surfaces generally at 90° to the force which the circlip is resisting. Under continuous, high axial load, the circlip can deform to shallow conical form. Differential coefficients of expansion of the male and female portions (or uneven heating of materials with the same expansion coefficient) can cause relative radial displacement of the male and female components resulting in increased conic deformation of the circlip due to the increased moment. This situation is illustrated in FIG. 2 of the drawings. In this situation, pressure on the circlip is increased significantly since the load is applied to the circlip along the contact edges shown as points P in cross-section. The change of loading on the circlip during operation of the assembly is therefore substantial. Moreover, for the assembly to restore itself as the cylinder 2 contracts radially with reducing temperature, the work done against applied axial force for the edge P of the cylinder to ride up the inclined upper surface of the circlip in the figure is also significant. Even when the assembly reverts to its original temperature, the continuation of axial load, and the circlips conical inclination to the plane of restoration, can mean that, instead of restoration, racking loads lead to increased tensile load in the female component and increased compressive load in the male component.

The problems described above are common to both internal and external circlips and are exacerbated at large component diameters and for components with large expansion differentials These constraints mean that, for large diameter components and high axial loads, such as occur in a Stirling engine for example. conventional circlips are entirely unsuitable. The conventional alternative of fixing components with a ring of bolts also has numerous drawbacks such as high costs. potential access problems, and less than 360° pressure bearing.

SUMMARY OF THE INVENTION

According to the present invention there is provided a circlip comprising a band of material forming an incomplete ring, and having bearing surfaces, which are curved in transverse cross-section, at opposite ends of the major transverse dimension of the band, wherein the said major dimension is generally orientated at less than 90° to the central axis of the ring in the unstressed state of the circlip.

In accordance with the invention, therefore, the major transverse dimension of the circlip is at an angle of less than 90° to its central axis, in contrast to a conventional circlip as shown in FIG. 1 where the major transverse dimension is parallel to the radial plane of the circlip and hence at 90° to its central axis. In embodiments of the present invention, therefore, the major transverse dimension of the circlip is orientated at an angle of less than 90°, and preferably a small acute angle, to the axial force which the circlip is intended to resist in the assembled state. The aforementioned angle may vary depending on the particular construction and application, and may be 0° in some cases (ie. major transverse dimension parallel to central axis). However, it is preferred that the angle is an acute angle greater than 0° and preferably less than about 45° and most preferably less than about 15°.

The curved bearing surfaces allow for reduced contact pressures and good articulation in use as discussed further below. Advantageously the bearing surfaces are part-circular in transverse cross-section. While concave bearing surfaces might be envisaged for some applications, it is preferred that the part-circular surfaces are convex. That is, the band is preferably provided with rounded sides at each end of its major transverse dimension. Further, while other arrangements may be envisaged, it is preferable for the bearing, surfaces to be continuous around the circumferential extent of the circlip.

Circlips embodying the invention may have various shapes in transverse cross-section. In a particularly simple construction, the transverse band cross-section has substantially straight, parallel major sides and is symmetrical about its major axis. It is to be appreciated however that curved, irregular or other non-symmetrical sections may be envisaged. In some embodiments, particularly if the circlip is nonmetallic, the band cross-section may be tapered on each side of its minor axis toward the bearing regions. In this case, the increased thickness of the mid-section of the band may increase the compressive strength, ie. resistance to buckling, of the circlip. although such a construction is unlikely to be necessary in most practical situations.

The invention also provides apparatus for connecting of first and second members, which apparatus comprises: a male portion of the first member; a female portion of the second member for reception of the male portion of the first member: and a circlip as hereinbefore described, wherein the male and female portions have respective annular regions for abutting the bearing surfaces at opposite ends of the major transverse dimension of the circlip, whereby, in use, the circlip inhibits relative axial displacement of said portions tending to compress the circlip. Thus, applied force tending to cause relative axial displacement in a direction so as to compress the circlip is resisted. Since the circlips major transverse dimension is at less than 90°, and preferably a small acute angle, to its central axis, axial force applied to the assembly has at least a component, and preferably a major component, along the direction of the circlips major transverse dimension. The smaller the angle, the greater, proportionally speaking, the component of the force directed along the major dimension of the circlip, and hence the more effective the circlip in resisting that force.

The said annular regions are preferably curved in transverse cross-section, and most preferably part-circular in transverse cross-section. Since the bearing surfaces of the circlip are curved, this construction allows effective articulation of the circlip in engagement with the annular regions to accommodate differential expansion/contraction of components in use. As indicated above, the curved bearing surfaces of the circlip are preferably convex, and accordingly the said annular regions are preferably annular recesses for receiving the convex bearing surfaces. (Of course, the alternative configuration where the circlip bearing surfaces are concave and engage annular projections on the male and female portions is also possible). It is particularly preferred that the bearing surfaces and annular recesses have substantially the same radius of curvature, and that, in transverse cross-section, the angle subtended by the ends of the curved surface of each recess is greater than the angle subtended by the ends of the corresponding bearing surface. Thus, the curved recess surfaces preferably extend over a greater angle than the curved bearing surfaces to facilitate assembly and expansion angulation. For improved security against dislodgement of the circlip in use, in preferred arrangements, at least one and preferably both of the male and female portions have an abutment surface adjacent the annular recess for assisting retention of the bearing regions of the circlip in the recesses.

Advantageously, the angle of the major transverse dimension of the circlip to its central axis in the unstressed state of the circlip is greater than the corresponding angle when the apparatus is assembled with the bearing surfaces received in the annular recesses. As will be explained further below, this feature assists installation of the circlip and also ensures that the circlip is generally biased into engagement with the male and female portions in use.

BRIEF DESCRIPTION OF THE DRAWINGS

Preferred embodiments of the invention will now be described, by way of illustrative and non-limiting example, with reference to the accompanying drawings in which:

FIGS. 3a and 3b are perspective and front views respectively of a circlip embodying the invention;

FIG. 5b is an enlarged view of part of FIG. 5a;

FIG. 8 shows a further embodiment of the circlip.

DETAILED DISCUSSION OF THE PREFERRED EMBODIMENTS

Referring to FIGS. 3a and 3b, the circlip 8 embodying the invention is formed of a steel band forming a generally circular ring having a gap 9 therein. The circlip is generally part-conical in form so that, in transverse cross-section as indicated by the broken line in FIG. 3a, the major transverse dimension of the band is orientated at an acute angle a to the central axis A of the ring. The conical shape is exaggerated in the figure for clarity, the angle $\alpha$ in the unstressed state of the circlip being about 11° in this embodiment.

The upper and lower edge surfaces 10, 11 of the band are rounded, being part-circular in cross-section over an angle of, in this case, about 120°. The edge surfaces 10, 11 form the main bearing surfaces of the circlip as will be described below. As can be seen from the transverse cross-section, the major sides of the section are parallel and substantially straight between the bearing surfaces 10, 1 1, the section being symmetrical about its major axis. In cross-section, the aspect ratio of the band cross-section is about 10:1 in this embodiment. As in a conventional circlip, the gap 9 is provided to allow for some radial compression of the circlip, but in this preferred embodiment the gap 9 is of larger width on the larger diameter side of the circlip for a reason explained below.

Figure 1:
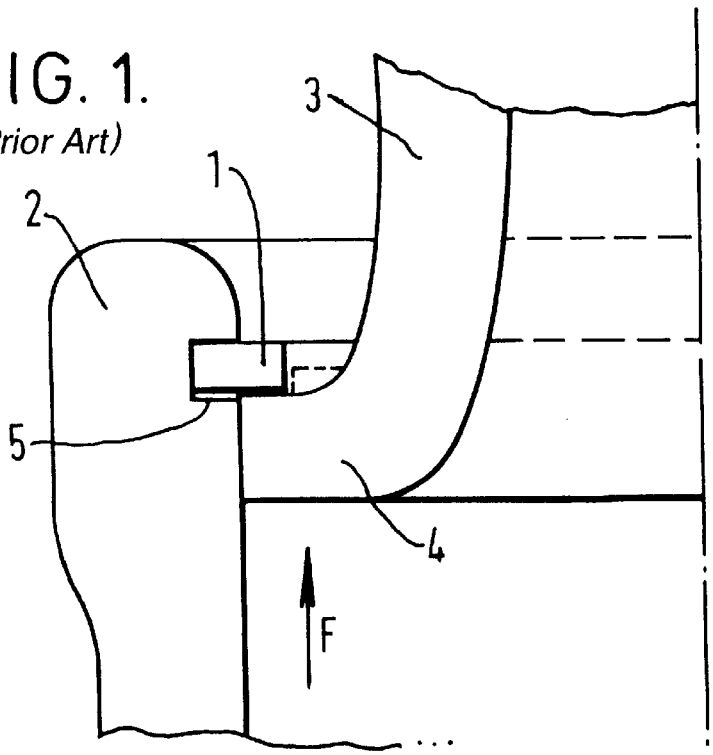
FIGS. 1 and 2 are schematic cross-sectional views of part of a conventional circlip assembly.
Figure 2:
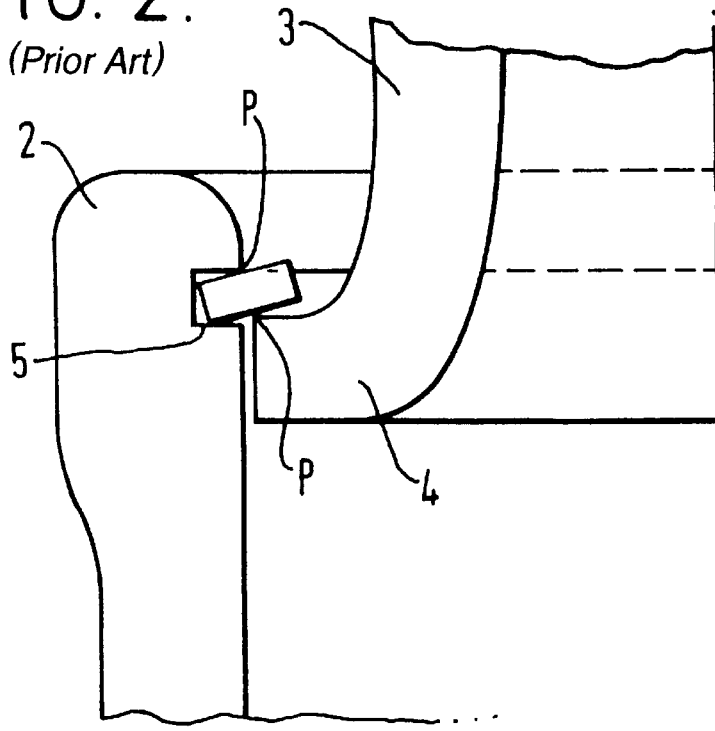
Figure 4A:
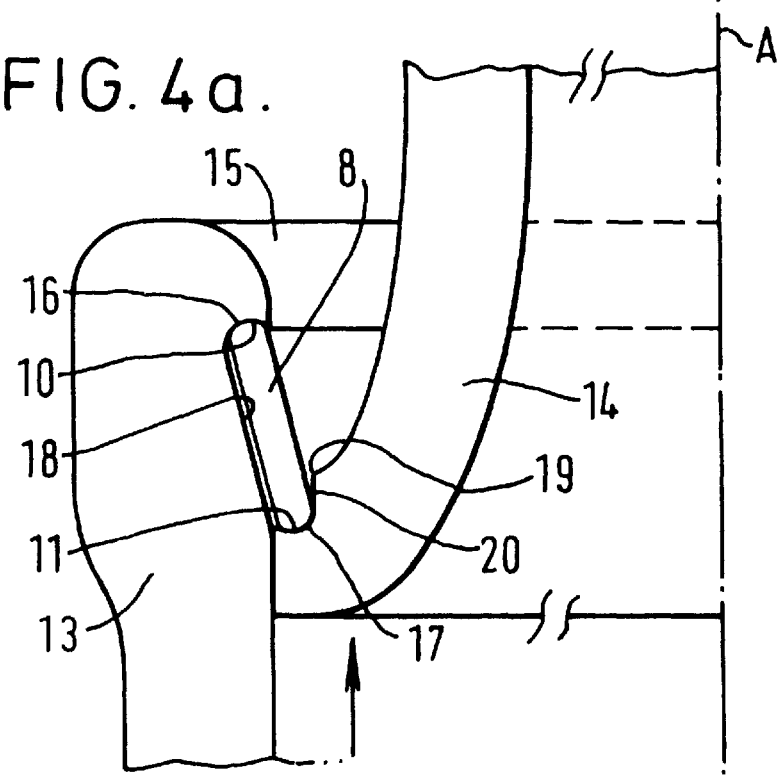
FIGS. 4a and 4b are schematic views, similar to FIGS. 1 and 2, but showing a circlip assembly embodying the invention.

FIG. 4a is a view similar FIG. 1 but showing apparatus embodying the invention and incorporating the circlip 8 of FIGS. 3a and 3b. Here, the circlip 8 is used for attaching and locking the cylinder mouth 13 of a Stirling engine to the base flange of the cylinder head 14. The figure shows a cross-sectional view through a portion of the apparatus, the central axis A of the circlip 8 being aligned with the longitudinal axis of the cylinder 13 and base flange 14. As illustrated, the base flange 14 forms the male portion which is received in the mouth of the cylinder 13 so that the lateral edge of the base flange 14 abuts the internal surface of the cylinder at normal temperatures. The internal surface of the cylinder mouth has an annular recess 16 therein for receiving the larger diameter bearing surface 10 of the circlip. Similarly, the exterior surface of the base flange 14 has an annular recess 17 therein for receiving the opposite bearing surface 11 of the circlip. Between the recess 16 and the abutting edge of the base flange 14, the interior surface 18 of the cylinder mouth is generally shaped for conformity with the outer surface of the circlip. The portion of the surface 18 adjacent to recess 16 provides an abutment surface to prevent dislocation of the upper bearing surface from its recess under extreme conditions. More importantly, the base flange 14 has a shoulder 19 adjacent the recess 17 providing an abutment surface 20 to prevent dislocation of the lower bearing surface 11 from its recess.

Clearly the function oi the circlip 8 is to prevent relative axial displacement of the cylinder and base flange in a direction tending to separate the components. It will be seen, however, that, in view of the construction of the circlip 8, the circlip is dramatically more effective in performing this function than the conventional circlip arranged as shown in FIG. 1. The reason is that the major transverse dimension of the circlip between the bearing surfaces 10 and 11 is orientated at an acute angle (here a small angle) to the axis A and hence to the force which the circlip is resisting. The circlip thus operates in compression rather than in shear.

Increasing the axial load on the assembly simply increases the engagement force of the bearing surfaces 10, 11 in their recesses 16, 17, thus providing a keystone effect, and because the major component of the force resisted by the circlip is parallel to its major transverse axis, the circlip 8 can resist significantly higher loads than conventional circlips.

Thus, in view of its construction, the circlip is effective at much larger diameters and significantly higher loads than conventional circlips. For example, in the application described, the circlip diameter may be about 30 cm and can resist axial loads of 7 tonnes or even greater which can result from the extremely high pressures developed in the Stirling engine cylinder. Under these conditions, a conventional circlip would be uneconomic at best.

Figure 4B:
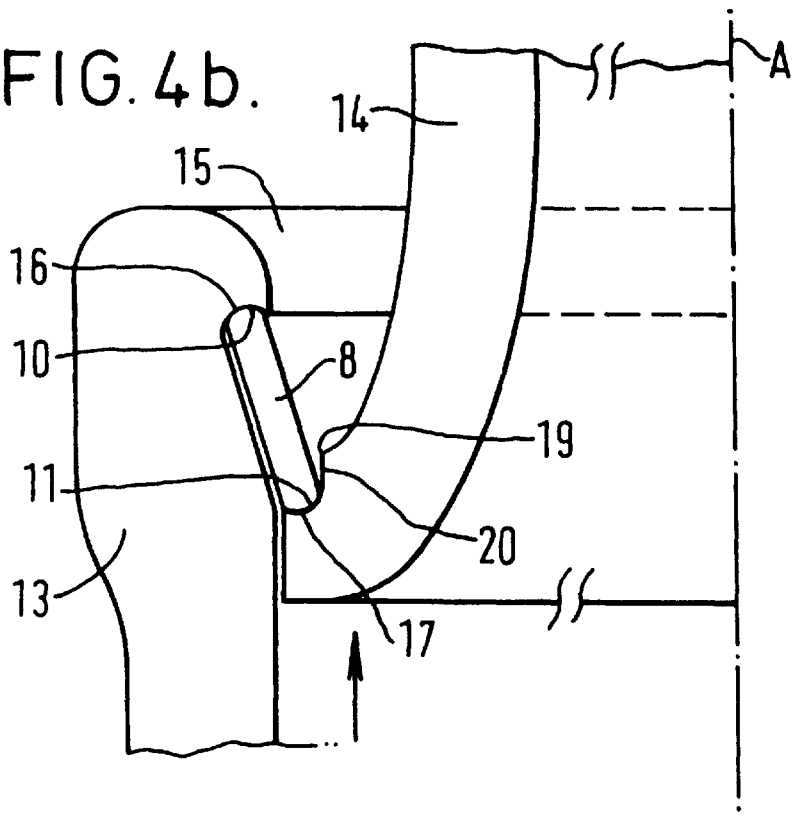

Moreover, the construction of the circlip 8 is such that it can accommodate differential expansion of the mnale and female components far more efficiently than a conventional circlip. FIG. 4b shows the situation where differential expansion has caused the abutting surfaces of the cylinder 13 and base flange 14 to separate. As these surfaces gradually move apart, the rounded bearing surfaces 10, 11 articulate in the recesses 16, 17, the conical circlip in effect behaving substantially as a circular ring of individually swivelling props. The character of this articulation during operation (and during assembly for the initial engaging phase as described below) is not bending in the radial plane of the circlip as in a conventional circlip assembly, but rather torsional deflection about the toroidal axis of the circlip. Clearly, differential expansion will cause some circumferential sliding of the bearing surfaces relative to the recesses, but dislocation of the bearing surface 11 from the recess 17 is prevented by the abutment surface 20 of the shoulder 19 on the base flange. Similarly, even under extreme loading conditions, the surface 18 of the cylinder mouth 13 prevents lateral outward displacement of the upper circlip edge.

It will be appreciated that the problems described above associated with differential expansion in conventional circlip assemblies are substantially avoided in the assembly of FIG. 4. In particular, the change of loading on the circlip 8 due to differential expansion is insignificant as compared with the conventional arrangement, and work done against applied axial force for restoration of the assembly is effectively negligible. Hoop stresses on the male and female members (compressive in the male and tensile in the female) are also reduced as compared with the conventional circlip assembly.

Figure 5A:
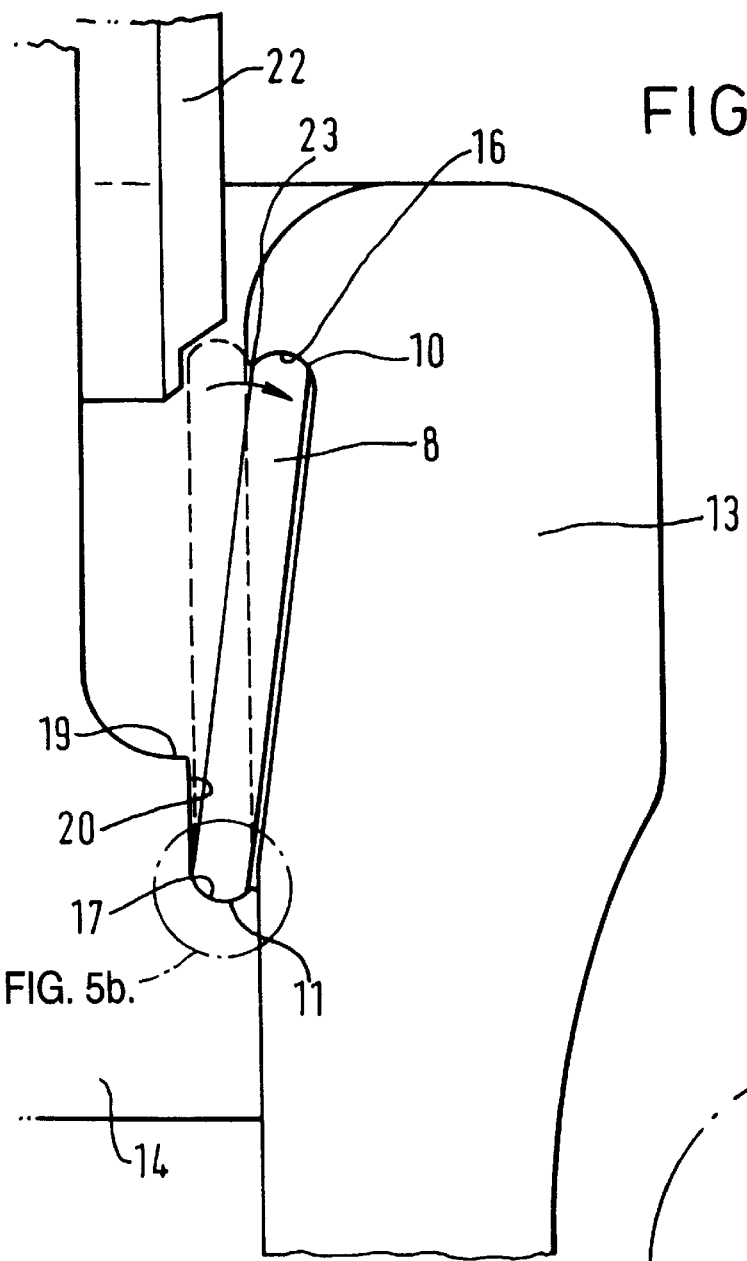
FIG. 5a is an enlarged view of part of the embodiment of FIG. 4a and illustrating installation of the circlip.
Figure 5B:
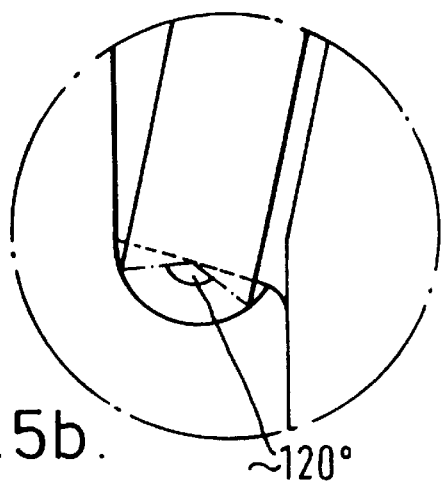

FIG. 5a shows an enlarged view of the opposite side of the assembly of FIG. 4a, again in partial cross-section, to illustrate more clearly the engagement of the circlip with the male and female components. As illustrated in this figure and the further enlargement of FIG. 5b, the part-circular recesses 16, 17 extend over a greater angle of curvature than the circlip bearing surfaces 10, 11. In this example, the recesses 16, 17 extend over an angle of about 180° as compared with the bearing surfaces which extend over an angle of about 120°. The Greater recess angle is provided to accommodate expansion angulation, and to facilitate installation of the circlip as will now be described.

The circlip 8 can be installed using a generally cylindrical pusher tool 22, part of which is shown schematically in FIG. 5a. Initially, the circlip 8 is slipped over the base flange 14 with the smaller diameter bearing surface 11 towards the bottom in the figure. The pusher 22 is pushed against the inner surface of the circlip until the lower bearing surface 11 is urged downwardly into the recess 17. At this point, the circlip is orientated as indicated schematically by the broken lines in the figure. At this stage in the process, the upper edge of the circlip bearing against the lip of the cylinder mouth is urged radially inwardly, causing radial compression of the upper section of the circlip. This radial compression is accommodated by the larger width of the upper end of the gap 9 as shown in FIG. 3, and results in the cone angle ce being reduced as the upper portion of the circlip is compressed radially to a greater extent than the lower portion. The effect of this decreased cone angle is to bias the upper edge of the circlip shown in FIG. 5a outwardly towards the cylinder. Thus, as downward pressure is then applied to the bearing surface 10 by the pusher 21 until the surface 10 clears the edge 23 of the recess 16, (which axial movement may be accommodated by resilient mounting of the components 13, 14 relative to one another) the upper portion of the circlip springs into the recess 16 as indicated by the arrow in the figure. During this process, restoration of the cone angle is prevented by abutment of the lower end of the circlip with the abutment surface 20 of the shoulder 19 on the base flange. Even when the circlip is in position as indicated by the solid lines in FIG. 5a it is preferred that the unstressed cone angle of the circlip is not fully achieved. That is, in the assembled apparatus, the cone angle is still less than the unstressed cone angle of the circlip. This biases the bearing surfaces 10, 11 into the recesses, improving retention before application of axial load. In this embodiment, in the assembled state the cone angle is about 9°, whereas, in the unstressed state, the cone angle is about 11° as previously mentioned.

Clearly, the closer the cone angle is to zero the closer the major transverse dimension of the circlip is to being parallel to the force which it resists, and therefore the greater the load-bearing capacity of the circlip. The lower limit of the cone angle will of course depend on the particular construction of the assembly components. bearing in mind that the male portion must be insertable in the opening of the female portion. The length of the major transverse dimension may of course be increased to allow a reduction of the cone angle. Further, with appropriately constructed male and female components, the cone angle may even be zero in some embodiments so that the major transverse dimension of the circlip is parallel to the central axis. For example, it will be apparent from a consideration of FIG. 4a that, in an alternative arrangement where the male member can be inserted in the female member in the direction shown by the arrow, then the annular recesses of the two members could be aligned one above the other, rather than radially offset, to accommodate a generally cylindrical circlip. A practical upper limit for the cone angle will again depend on the particular application, but can of course be reduced for smaller diameter and/or smaller load applications.

Various further advantages of the circlip assembly described above will be apparent to those skilled in the art. For example, it will be seen that the radial clearance required for installation of the circlip 8 is significantly less than in the conventional assembly of FIG. 3. Moreover, if desired to facilitate removal, the circlip 8 can be provided with radially disposed "ears" at its ends adjacent the gap 9. without prejudicing the self-locking action of the circlip. (Of course, even earless embodiments as shown in FIG. 3 may be provided with holes to facilitate installation and removal using circlip pliers, for example at the ends of the band adjacent the gap 9 towards the larger diameter side of the circlip.) In addition, although the circlip 8 has been described as made of steel, the efficiency is such that material of less strength may be used in situations where this would not be possible with conventional circlips. Similarly, the improved bearing properties as compared with conventional circlips are such that use of circlips embodying the invention will be possible even where the male and female components are made of relatively soft. non-ferrous material, or even, for example, carbon reinforced plastics.

Many of the constraints on conventional circlip assemblies are therefore alleviated, and yet circlips embodying the invention can be manufactured simply and at low cost. For example, circlips as shown in FIG. 4 can be rolled/extruded as a continuous length which is then rolled/stretched by a forming roller into conical form and cut into sections. The same cross-section strip may be rolled up into a wide range of diameters, and the cone angle may be readily changed by varying the angle of the forming (coning) roller.

Figure 6:
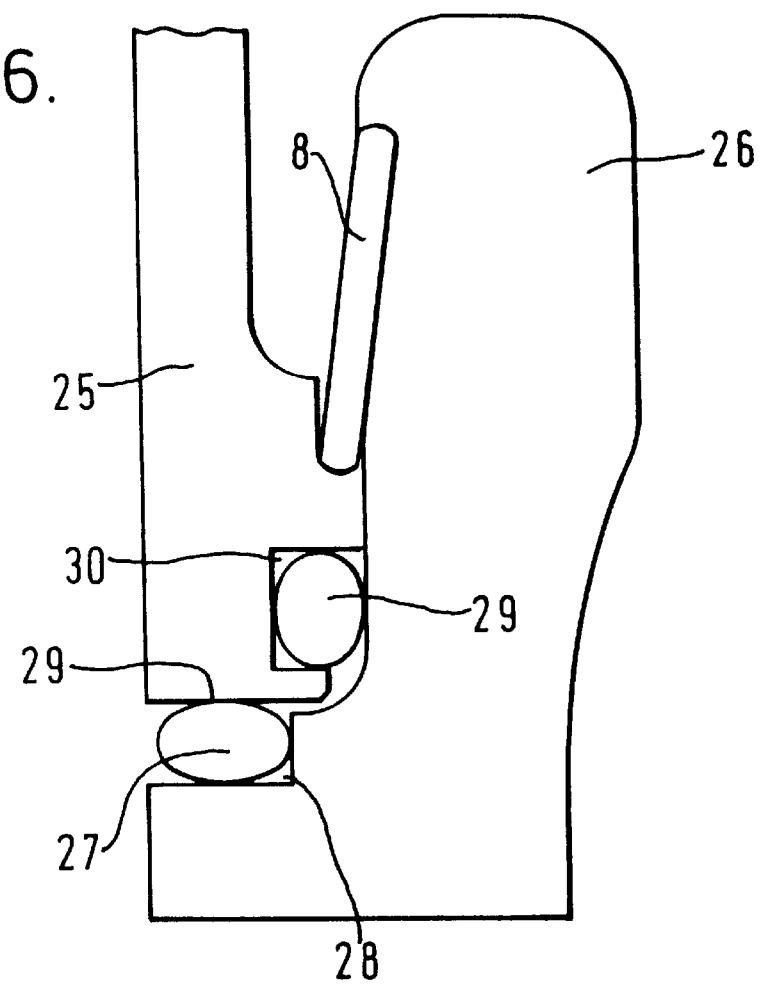
FIG. 6 is a schematic cross-sectional view of part of another circlip assembly embodying the invention.
Figure 7:
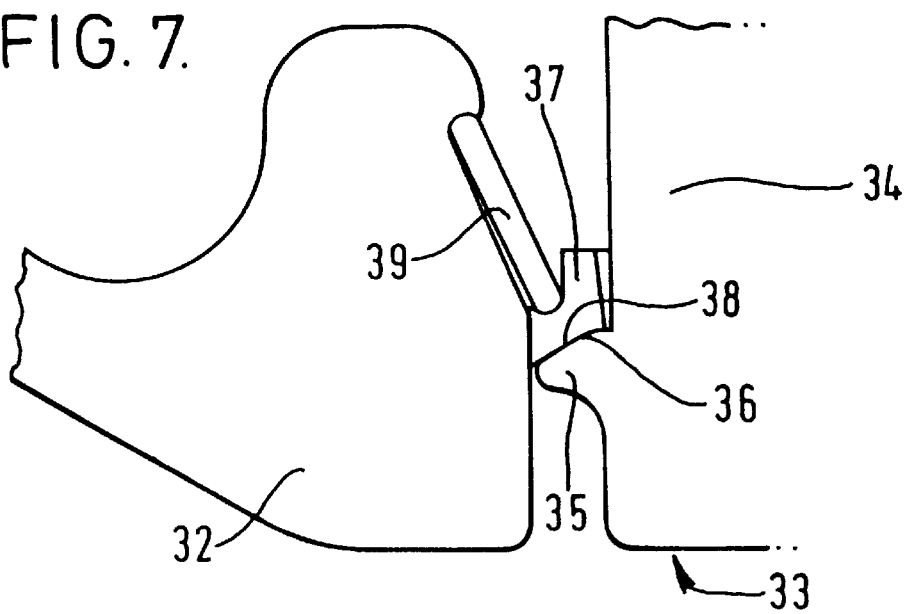
FIG. 7 is a schematic cross-sectional view of part of a further circlip assembly embodying the invention.

FIGS. 6 and 7 show examples of alternative embodiments of the invention. showing modified constructions of the male and female assembly portions. In each case, only part of the assembly is shown in transverse cross-section, in a similar manner to FIGS. 4 and 5. In FIG. 6 resilient mounting of the male portion 25 relative to the female portion 26 is provided by an O-ring 27 in annular groove 28 of the female member. The lower end 29 of the male portion 25 abuts the O-ring 27 to allow slight axial depression of the male portion 25 relative to the female portion 26 to facilitate installation of the circlip 8 as mentioned above. In this embodiment. a further O-ring 29 is received in a recess 30 of the male portion 25 to provide a seal. The circlip and retaining portions of the assembly are otherwise the same as those already described.

FIG. 7 again shows different constructions for the male and female portions. In this embodiment, reference numeral 32 designates the female portion, and the male portion is generally indicated at 33. The male portion 33 comprises a main body 34 having an annular projection 35. The projection 35 has an upper curved surface 36 on which an annular member 37, having a corresponding curved, lower surface 38. rests in use. The surfaces 36, 38 have a large radius of curvature and are actually part-circular in cross-section to allow for articulation. The annular member 37 of the male portion 34 is provided with the recess and abutment surface for receiving the smaller diameter bearing surface of a circlip 39 in the manner previously described. The circlip 39 is generally similar to the circlip 8 previously described, but has a diameter of only about 10 cms. In view of its application in a smaller diameter assembly, the cone angle of the circlip is considerably greater (here about 30°) than that of the larger diameter embodiments described above.

FIG. 8 shows a circlip 40 of a further embodiment of the invention. In this embodiment, the circlip 40 has a plurality of apertures 41 around the band. The apertures 41 serve as vents to allow for airflow in the assembled apparatus. Because the circlip operates in compression, the vent apertures 41 do not materially affect operation of the circlip, whereas venting of conventional circlips, which operate in shear, would clearly be impractical. The vent apertures 41 are conveniently generally elliptical as shown, but the particular shape and arrangement of the apertures may of course vary.

It will of course be appreciated that many modifications can be made to the specific embodiments described above without departing from the scope of the invention. For example, while embodiments have been described in which the bearing surfaces of the circlip are convex for articulation in bearing recesses of the male and female members, it would be possible for the circlip bearing surfaces be concave. In this case, the male and female members could be provided with convex formations such as annular lips; or ridges for reception of the concave bearing recesses of the circlip. The arrangement described above with reference to the figures is, however, preferred.

What is claimed is:

1. A circlip comprising a band of material in part-conical form forming an incomplete ring, said band having a transverse major dimension along a major axis and having a central axis, and having bearing surfaces located at opposite ends of said dimension of the band, said bearing surfaces curved in transverse cross-section wherein said dimension is at an angle of less than about 45° with respect to the central axis when in an unstressed state of the circlip.

2. A circlip as claimed in claim 1 wherein the curved bearing surfaces are convex.

3. A circlip as claimed in claim 1 wherein the bearing surfaces are part-circular in transverse cross-section.

4. A circlip as claimed in claim 1 wherein the bearing surfaces have substantially the same radius of curvature.

5. A circlip as claimed in claim 1 wherein the bearing surfaces are substantially continuous around a circumferential extent of the circlip.

6. A circlip as claimed in claim 1 wherein the said major dimension is at an angle of less than about 15° to the central axis.

7. A circlip as claimed in claim 1 wherein the transverse band cross-section has substantially straight, parallel major sides and is substantially symmetrical about the major axis thereof.

8. A circlip as claimed in claim 1 wherein the band has vent apertures therein.

9. Apparatus for connecting first and second members, the apparatus comprising:
   a male portion of the first member;
   a female portion of the second member for reception of the male portion of the first member; and
   a circlip comprising a band of material in part-conical form forming an incomplete ring, said band having a transverse major dimension along a major axis and having a central axis, and having bearing surfaces located at opposite ends of said dimension of the band, said bearing surfaces curved in transverse cross-section. wherein said dimension is at an anole of less than 90° with respect to the central axis when in an unstressed state of the circlip;
   wherein the male and female portions have respective annular regions for abutting the bearing surfaces at opposite ends of the major transverse dimension of the circlip, whereby, in use, the circlip inhibits relative axial displacement of said portions tending to compress the circlip.

10. Apparatus as claimed in claim 9, wherein the annular regions are annular recesses for receiving the respective bearing surfaces of the circlip.

11. Apparatus as claimed in claim 9 wherein at least one of the male and female portions has an abutment surface adjacent the annular region for inhibiting dislocation of the bearing surfaces of the circlip from the annular region.

12. Apparatus as claimed in claim 9 wherein the annular regions are curved in transverse cross-section.

13. Apparatus as claimed in claim 12 wherein the annular regions are part-circular in transverse cross-section.

14. Apparatus as claimed in claim 13 wherein the radius of curvature of each annular region is substantially equal to a radius of curvature of the corresponding bearing surface.

15. Apparatus as claimed in claim 14 wherein, in transverse cross-section, the angle subtended by the ends of the curved surface of each annular region is greater than the angle subtended by the ends of the corresponding bearing surface.

16. Apparatus as claimed in claim 9 wherein the angle of said major dimension to the central axis of the circlip in the unstressed state is greater than the corresponding angle when the apparatus is assembled with the bearing surfaces of the circlip abutting the annular regions of the male and female portions, whereby the circlip is biased into engagement with the male and female portions in the assembled state.

17. Apparatus as claimed in claim 9 including resilient means located between the male and female portions for inhibiting relative axial displacement of the male and female portions in the opposite direction to the relative displacement inhibited by the circlip.

18. Apparatus as claimed in claim 9 wherein the first and second members are components of a Stirling engine.

19. Apparatus as claimed in claim 18 wherein the second member comprises an engine cylinder of said Stirling engine, the female portion comprising a cylinder mouth, and wherein the first member comprises a cylinder head, and the male portion comprising a base flange of the cylinder head.

20. Apparatus for connecting first and second members, the apparatus comprising:

a male portion of the first member;

a female portion of the second member for reception of the male portion of the first member; and a circlip comprising a band of material forming an incomplete ring, and having, at opposite ends of a major transverse dimension of the band, bearing surfaces which are curved in transverse cross-section, wherein said major transverse dimension is generally oriented at less than 90° to a central axis of the ring in an unstressed state;

wherein the male and female portions have respective annular regions for abutting the bearing surfaces at opposite ends of the major transverse dimension of the circlip, whereby, in use, the circlip inhibits relative axial displacement of said portions tending to compress the circlip, wherein the angle of said major transverse dimension to the central axis of the circlip in the unstressed state is greater than the corresponding angle when the apparatus is assembled with the bearing surfaces of the circlip abutting the annular regions of the male and female portions, whereby the circlip is biased into engagement with the male and female portions in the assembled state.

21. A circlip comprising a band of material in part-conical form forming an incomplete ring, said ring having two ends and a gap between said ends, said band having a transverse major dimension along a major axis and having a central axis, and having bearing surfaces located at opposite ends of said dimension of the band, said bearing surfaces curved in transverse cross-section, wherein said dimension is at an angle of less than 90° with respect to the central axis when in an unstressed state of the circlip.

* * * * *